United States Patent [19]
Baggett, Jr. et al.

[11] Patent Number: 4,915,758
[45] Date of Patent: Apr. 10, 1990

[54] RACEWAY FRAME AND METHOD FOR CURVED MODULAR WALL PANEL

[75] Inventors: George E. Baggett, Jr., Oswego; Robert W. DeRoss, Naperville, both of Ill.

[73] Assignee: Molex Incorporated, Lisle, Ill.

[21] Appl. No.: 278,389

[22] Filed: Dec. 1, 1988

Related U.S. Application Data

[62] Division of Ser. No. 214,075, Jul. 1, 1988, Pat. No. 4,835,921.

[51] Int. Cl.$^4$ ............................................. B29C 65/08
[52] U.S. Cl. : .................................. 156/73.1; 156/245; 156/304.2; 156/304.5; 156/304.6; 52/729
[58] Field of Search ................. 156/73.1, 304.1, 304.2, 156/304.3, 304.5, 304.6, 78, 292, 580.1, 245, 73.5, 580.2; 52/729

[56] References Cited

U.S. PATENT DOCUMENTS 4,640,728  2/1987  Martin et al. .................... 156/304.5

FOREIGN PATENT DOCUMENTS 2619143  11/1977  Fed. Rep. of Germany ..... 156/73.1

OTHER PUBLICATIONS

"Joint Design for Ultrasonic Welding", Branson Technical Information PW-3 (Aug. 1980).

Primary Examiner—Michael Wityshyn
Attorney, Agent, or Firm—Louis A. Hecht; Stephen Z. Weiss

[57] ABSTRACT

A raceway frame for a curved modular wall panel is made of molded thermoplastic material in order to avoid the expense of secondary forming operations. The frame is generally of an I-shape and is molded in two T-shaped sections which are joined by, for example, ultrasonic welding at the contacting bases of the T-sections.

3 Claims, 2 Drawing Sheets

U.S. Patent   Apr. 10, 1990   Sheet 1 of 2   4,915,758
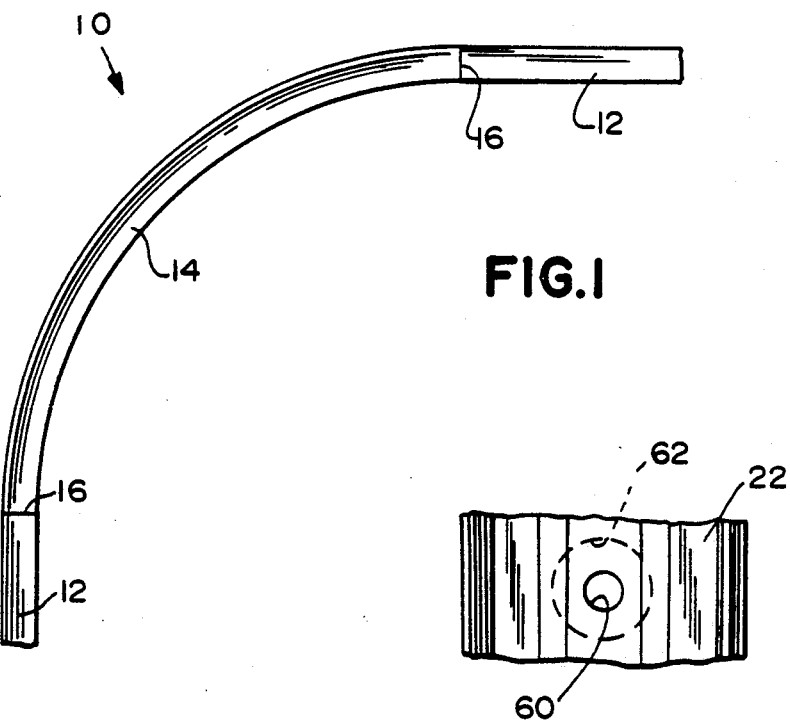
FIG.1
FIG.4
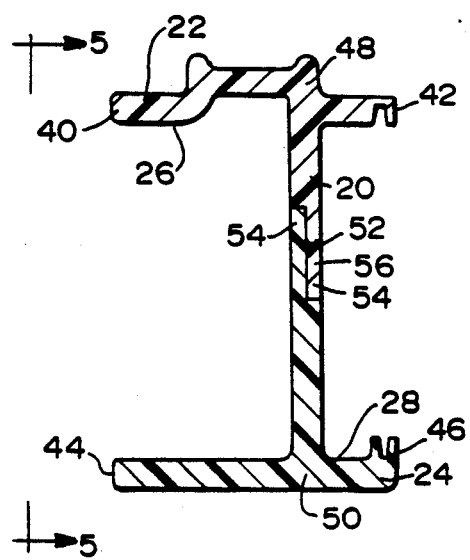
FIG.2

RACEWAY FRAME AND METHOD FOR CURVED MODULAR WALL PANEL

This application is a division of prior application Ser. No. 214,075, filed July 1, 1988, now U.S. Pat. No. 4,835,921.

FIELD OF THE INVENTION

The present invention relates to raceway frames for modular wall panels and more particularly to an improved curved raceway frame molded of plastic material.

DESCRIPTION OF THE PRIOR ART

Modular wall panel systems are used for subdividing larger interior spaces into smaller offices, work areas and the like. Such systems include modular wall panels of predetermined dimensions capable of easily and economically being arranged and assembled into a wall system. Conventionally, each modular wall panel has a raceway extending longitudinally along the bottom of the panel in which electrical power conductors and connectors may be prewired and in which communication cables, data cables and the like may extend between different regions of the wall system.

A raceway frame is conventionally used in the panel raceway. The conventional raceway frame is a metal frame member, typically extruded aluminum, generally of an I-shape with a central column or web portion and upper and lower flanges defining opposed recesses on opposite sides of the frame in which suitable power and other electrical conductors may be disposed. The modular wall panels may be straight or may be curved in the elongitudinal direction. U.S. Pat. No. 4,703,985 is incorporated here by reference and may be consulted for a further description of elements of a prior art modular wall system.

A metal raceway frame, such as extruded aluminum, serves well for straight modular wall panel raceways. However, a curved wall panel presents special problems. Conventionally, in order to make a curved raceway frame, the straight frame member is deformed and bent into a curved shape. Since the top and bottom portions of the I-shaped cross section are generally parallel to the radius of curvature, the forming operation requires that the mettal be compressed at the inside diameter of the curved section and stretched or expanded at the outside diameter. As a result, it has proven to be extremely difficult to form a stright metal raceway frame in a secondary operation into a curved frame having the consistent dimensions required in this application. The forming operation has involved substantial labor cost and the further expense of scrap when frame members cannot be formed within the necessary manufacturing dimension tolerances.

Because of these difficulties, curved raceway frames have caused substantial problems and there has been a long felt but unsolved need or a satisfactory curved raceway frame and for a method of making such a frame.

SUMMARY OF THE INVENTION

A principal object of the present invention is to provide an improved raceway frame for curved modular wall panels capable of consistently and economically being manufactured to consistent tolerances. Another principal object of the invention is to provide an improved method for the manufacture of raceway frames for curved modular wall panels.

In brief, the objects and advantages of the present invention are achieved by providing a raceway frame for a curved modular wall panel including an elongated body having an arc-shaped segment lying in a curved path along the lengthwise direction of the body, the curved path having a radius of curvature. The body has a sbstantially uniform cross section throughout the length of the arcshaped segment. The cross section includes a first portion generally parallel to the radius of curvature and a second portion generally perpendicular to the radius of curvature. In accordance with the present invention the body of the raceway frame comprises a molded thermoplastic material.

In brief, a method of making a raceway frame for a curved modular wall panel in accordance with the present invention includes the steps of molding from a plastic material first and second elongated, generally T-shaped members each having a curved segment. The first and second members are aligned with the bases of the T-shapes in contact with one another. Securing means in the form of an ultrasonic weld, an adhesive joint or a mechanical fastener(s) may be used to retain the bases of the two T-shaped members together to complete the assembly ofan I-shaped body for the raceway frame.

BRIEF DESCRIPTION OF THE DRAWINGS

The present invention together with the above and oher objects and advantages may best be understood from the following detailed description of the embodiment of the invention illustrated in the drawings, wherein:

FIG. 1 is a top plan view of a portion of a modular wall system including a curved modular wall panel;

FIG. 2 is a vertical, cross sectional view of a raceway frame for the curved modular wall panel constructed in accordance with the present invention and taken along the line 2—2 of FIG. 3;

FIG. 4 is an enlarged view of the fragment of the raceway frame designated as area 4 in FIG. 3.

DETAILED DESCRIPTION OF THE PREFERRED EMBODIMENTS

Figure 3:
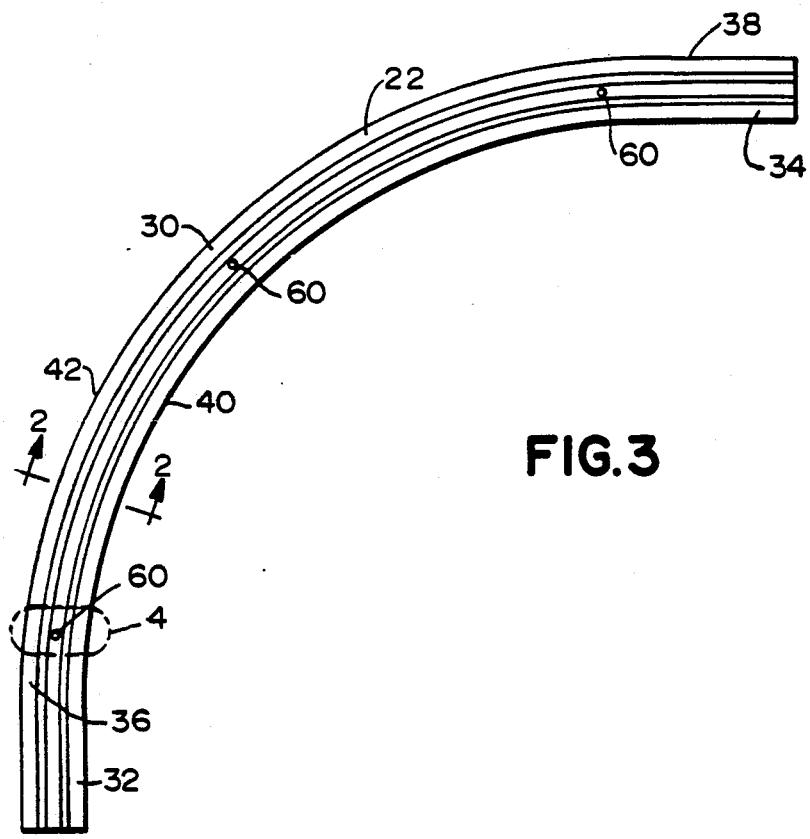
FIG. 3 is a top plan view of the raceway frame of FIG. 2.

Referring now to the drawings, in FIG. 1 there is illustrated a portion of a modular wall system generally designated as 10 including a pair of straight modular wall panels 12 and a curved modular wall panel 14. The ends of the panels 12 and 14 abut one another at junctions 16 where electrical connections can be made between electrical conductors contained in raceways extending longitudinally along the bottoms of each of the panels. The main bodies of the panels extend upwardly from the raceways for a desired height to provide walls to subdivide an interior space with the wall system 10.

A raceway frame 18 constructed in accordance with the principles of the present invention is shown in FIGS. 2-5. In cross section, as seen in FIG. 2, the frame is generally I-shaped including a vertically extending column or web portion 20, an upper, generally horizontal flange portion 22, and a lower, generally horizontal flange or foot portion 24. The I-shape defines a pair of recesses 26 and 28 at opposite sides of the vertical web 20 in which electrical conductors may extend along the length of the wall panel 14.

As seen in the top view of FIG. 3, the frame 18 includes an arc-shaped segment 30 continuous with and positioned between a pair of straight end segments 32 and 34. The arc-shaped segment 30 extends in the longitudinal direction along a curved path between points 36 and 38. To join a pair of straight wall panels 12 oriented at ninety degrees to one another, the segment 30 is a ninety degree arc.

The upper flange 22 includes an inner periphery 40 and an outer periphery 42 located at the inside diameter and outside diameter of the segment 30 relative to its radius of curvature. Similarly, the lower flange 24 includes an inner periphery 44 and an outer periphery 46. Due to the curved configuration of the arc-shaped segment 30, the inner peripheries 40 and 44 are substantially shorter than the outer peripheries 42 and 46. Flanges 22 and 24 are generally parallel to the radius of curvature of the segment 30 while the web portion 20 is generally perpendicular to the radius of curvature. This configuration has made it extremely difficult in the past to make a curved raceway frame by bending and shaping a straight metal raceway frame.

In accordance with the present invention, the raceway frame 18 is made not of metal, but instead comprises a molded engineering thermoplastic material. By engineering thermoplastic material is meant any of the commercially available, dimensionally stable thermoplastic molding compositions useful for forming durable shaped articles. Illustrative examples including moldable thermoplastic polyester compositions and moldable thermoplastic-polycarbonate compositions. Preferably the thermoplastic material is selected from impact modified thermoplastic polyester or polycarbonate molding compositions. Morever, engineering thermoplastics exhibiting high stiffness to weight ratios such as thermoplastic foam molding compositions may be advantageously employed. In addition, because the curved plastic raceway structures are intended for use in modular wall panels for offices in office buildings and the like it is preferable to use moldable thermoplastics which exhibit flame resistant and/or flame retardant properties. Many suitable commercially available engineering thermoplastic compositions useful for making the plastic raceway will suggest themselves to those skilled in the modular wall panel art. A preferred thermoplastic material for use herein is a flame retardant foam polycarbonate composition available from General Electric Company under the trade name FOAMED LEXAN® FL910-94VO.

The new and improved molded plastic frame 18 can be molded precisely in the desired shape so that secondary forming and shaping operations are not necessary. An important result of the invention is that the dimensions of the frame 18 can easily and precisely be controlled so that the frame 18 can be assembled properly with other components of the curved wall panel 14 to consistently achieve accurate mating between the ends of the panel 14 and the straight panels 12 at the panel junctions 16.

The cross section of the raceway frame 18 is uniform throughout its length, including both the arc-shaped segment 30 and the straight end segments 32 and 34. The body of the frame 18 is molded in two sections 48 and 50 that are joined at a lap joint 52. The upper section 48 includes the upper flange 22 as well as the upper portion of the web 20, while the lower section 50 includes the lower flange 24 and the lower portion of the vertical web 20. Thus, each section 48 and 50 is generally T-shaped with the cross member of the T defining the flange 22 or 24 and the base of the T defining part of the web 20.

The base portions of each of the segments 48 and 50 are provided with a lap configuration including an offset thin wall section 54. In making the frame 18, the two sections 48 and 50 are separately molded. Then the two sections are aligned with one another with the base portions of the sections in contact and with the offset walls 54 of the sections 48 and 50 in overlapping and abutting intimate engagement. The walls 54 are ultrasonically welded together at region 56 to form an intermolecular bond holding the sections 48 and 50 rigidly in assembly. The welding may be in a continuous line along the length of the frame or in a series of spots or regions. Alternatively, the base portions may be attached together in joint configurations other than a lap joint and by fastening means other than ultrasonic welding. Mechanical fasteners or adhesives could be used. Adhesive compositions should be suitable for bonding plastics without the need to apply heat. For example, one-part or two-part room temperature curable epoxy based adhesive compositions are suitable.

Figure 5:
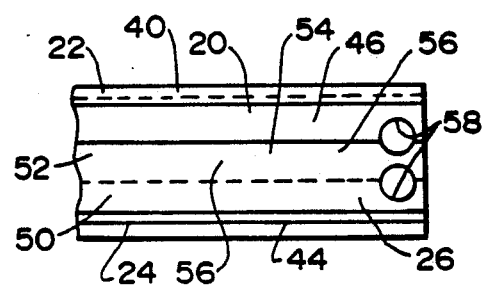
FIG. 5 is a fragmentary side elevational view of an end segment of the raceway frame taken from the line 5—5 of FIG. 2.

Other than assembling the two sections 48 and 50, the only secondary operations required in the manufacture of the raceway 18 are to form holes 58 (FIG. 5). In order to reduce the complexity of the molds required for forming sections 48 and 50, it is preferred to drill these holes after the molding operation is completed. Additional holes 60 and 62 (FIGS. 2–4) may be formed during molding.

While the invention has been described with reference to details of the illustrated embodiment, these details are not intended to limit the scope of the invention as defined in the appended claims.

We claim:

1. A method of making a raceway frame for a curved modular wall panel comprising the steps of:
    molding from a thermoplastic material a first elongated member of generally T-shaped cross section having a curved segment and a lap joint shape at the free end of the base of its T-shaped cross-section;
    molding from a thermoplastic material a second elongated member of generally T-shaped cross section having a curved segment and a lap joint shape at the free end of the base of its T-shaped cross section cooperating with said lap join shape of said first elongated member;
    aligning the first and second members with the bases of their T-shaped cross sections with said cooperating lap joint shapes in direct contact with one another; and
    assembling an I-shaped body from said members by securing the bases of said members together where the plane of the joint is parallel to the radius of curvature of said segments.

2. A method as in claim 1 in which said molding steps include molding a foamed polycarbonate thermoplastic material.

3. A method as in claim 2, said assembling step comprising ultrasonically welding said lap joint shapes together to make a welded lap joint.

* * * * *